Figure 1:
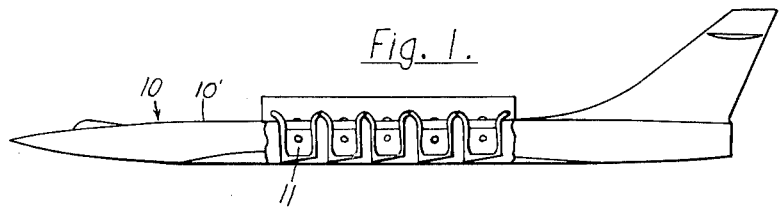

Dec. 21, 1965   M. I. TAYLOR ETAL   3,224,712
JET ENGINES AND TO AIRCRAFT PROVIDED WITH SAME
Filed Jan. 30, 1964   4 Sheets-Sheet 1

Inventors
Maurice Ian Taylor
Geoffrey Light Wilde
By
Cushman, Darby & Cushman
Attorneys

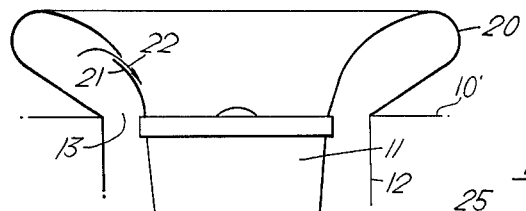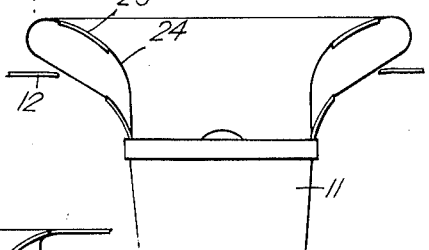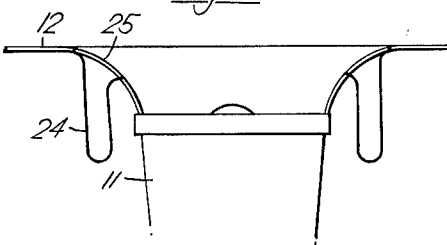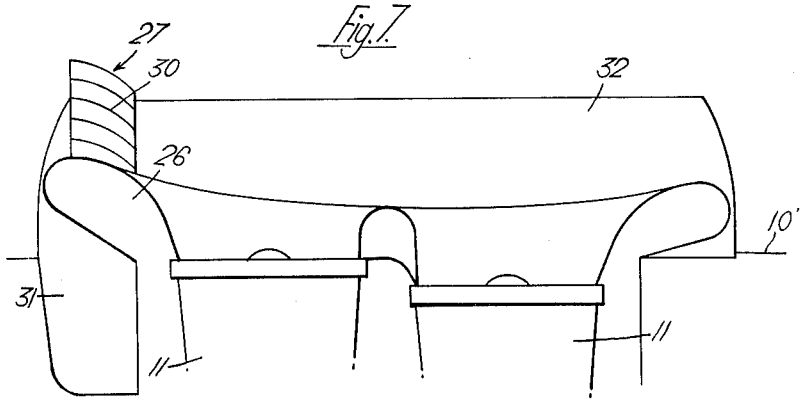

Dec. 21, 1965  M. I. TAYLOR ETAL  3,224,712
JET ENGINES AND TO AIRCRAFT PROVIDED WITH SAME
Filed Jan. 30, 1964  4 Sheets-Sheet 3
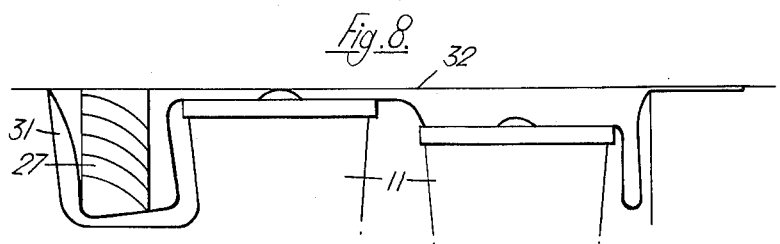
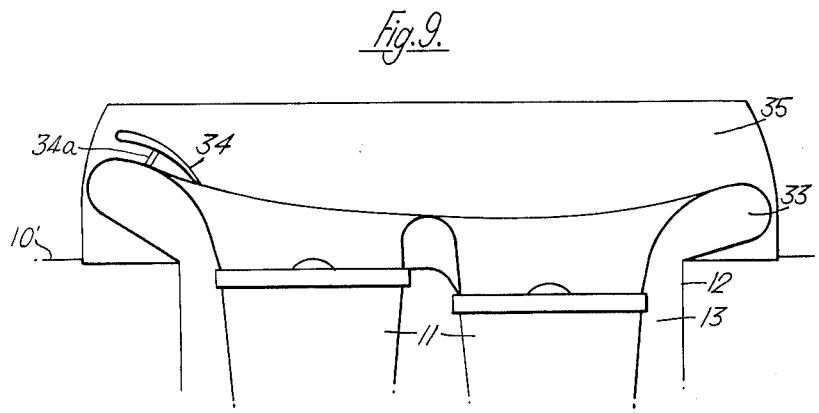
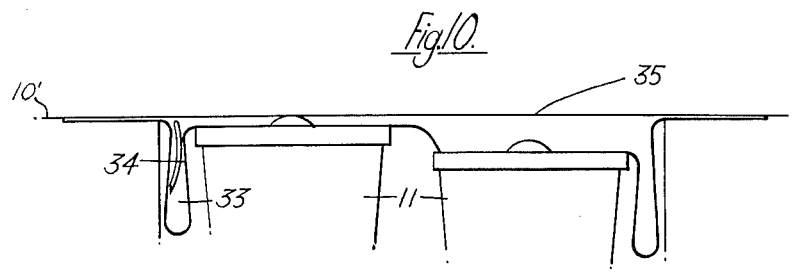

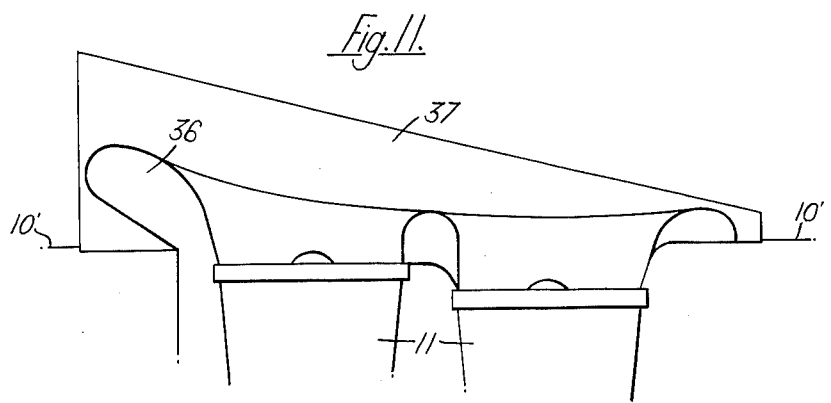
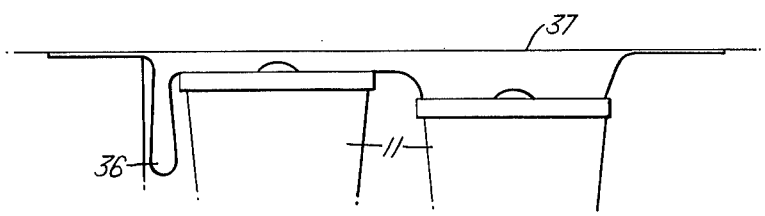

United States Patent Office 3,224,712
Patented Dec. 21, 1965

3,224,712
JET ENGINES AND TO AIRCRAFT PROVIDED
WITH SAME
Maurice Ian Taylor, Allestree, Derby, and Geoffrey Light
Wilde, Derby, England, assignors to Rolls-Royce Limited, Derby, England, a company of Great Britain
Filed Jan. 30, 1964, Ser. No. 341,236
Claims priority, application Great Britain, Feb. 4, 1963, 4,554/63
9 Claims. (Cl. 244—53)

This invention concerns jet engines and aircraft provided with such engines.

According to one aspect of the present invention, there is provided an aircraft having at least one vertically mounted vertical lift jet engine whose upper end is provided with an inflatable air intake member which, when inflated, extends above the remainder of the engine so as to guide the air passing into the engine and which, when deflated, does not so extend, means being provided for inflating and deflating the air intake member.

It will be appreciated that, when deflated, the length of the engine will be substantially less than would be the case if the engine were provided with a rigid air intake member. It is of course very desirable to reduce the length of the engine as much as possible.

The term "vertical lift engine," as used in this specification, is intended to indicate an engine which produces vertical lift forces on an aircraft independently of those generated aerodynamically by forward flight of the aircraft. Thus, for this purpose, the vertical lift engine may have a thrust to weight ratio of at least 8:1 and preferably of at least 12:1. Indeed it may have a thrust to weight ratio of 16:1 or even more.

The air intake member, may, for example, comprise a double walled bag or a tube formed of rubber or like resilient material.

Alternatively, the air intake member may be apertured in such a way that, when it is inflated, it emits a boundary layer energising jet of air which passes over the surface of the air intake member and so into the engine, the said jet entraining a flow of ambient air which does not become separated from the said jet before entering the engine.

According to another aspect of the present invention, there is provided a jet engine (e.g. a vertical lift jet engine) having an air intake member which is formed and/or provided with means for emitting a boundary layer energising jet of air which passes over the surface of the air intake member and so into the engine, the said jet entraining a flow of ambient air which does not become separated from the said jet before entering the engine.

The air intake member of the jet engine may be inflatable and may be arranged to emit the said boundary layer energising jet of air when inflated, means being provided for inflating and deflating the air intake member, the air intake member, when inflated, extending upstream of the remainder of the engine so as to guide the air passing into the engine, and, when deflated, not so extending.

The engine is preferably mounted within a housing from which it is spaced by an annular space, the arrangement being such that deflation of the air intake member causes the latter to be drawn into and retained in the said annular space.

The air intake member may be provided with an annular part of the wall of the housing, the said annular part of the wall immediately surrounds the engine and merging smoothly with the remainder of the said wall when the air intake member is deflated.

Alternatively, the air intake member may carry guide vane means which, when the air intake member is inflated, is disposed in an operative position in which it guides the air passing into the engine, the guide vane means being retracted into an inoperative position when the air intake member is deflated.

The air intake member may be mounted within a forwardly facing retractable intake scoop which, when the air intake member is inflated, is extended to cause air to be forced into the or each engine.

Figure 2:
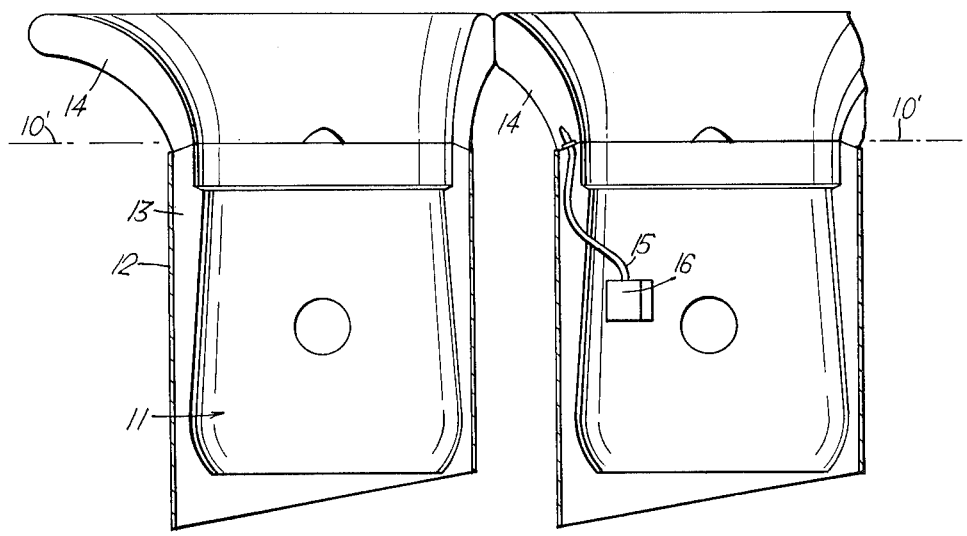
Figure 3:
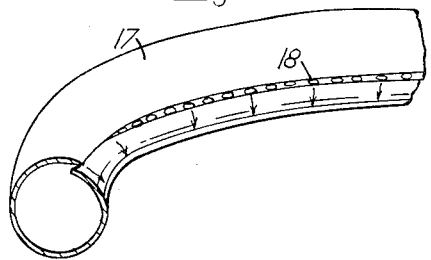

The invention is illustrated, merely by way of example, in the accompanying drawings, in which:

FIGURE 1 is a diagrammatic side view of an aircraft according to the present invention, FIGURE 2 is a broken away cross-section through the aircraft of FIGURE 1, FIGURE 3 is a broken away perspective view illustrating a modification of the present invention, FIGURE 4 is a broken away sectional view of a vertical lift engine having a modified air intake member, which is shown inflated, FIGURES 5, 7, 9 and 11 are broken away sectional views of vertical lift engines having various kinds of air intake members which are shown inflated, and FIGURES 6, 8, 10 and 12 are views similar to FIGURES 5, 7, 9 and 11 respectively but showing the air intake members deflated.

Referring first to FIGURES 1 and 2, a supersonic aircraft 10 is provided with forward propulsion gas turbine engines (not shown) and with a bank of ten vertical lift gas turbine engines 11, the engines 11 being arranged in two mutually adjacent rows.

Each of the vertical lift engines 11 is mounted within a vertically extending housing 12 from which it is spaced by an annular space 13. The housing 12 at its upper end is substantially flush with the exterior surface or skin 10' of the aircraft 10 and in any event does not extend outwardly of the external skin 10' of the aircraft 10.

Each of the vertical lift engines 11 is provided at its upper end with an inflatable non-inflammable and pressure and water resistant air intake member 14 which is constituted by a double-walled bag formed of rubber or like resilient material. Each of the air intake members 14 is connected by a pipe 15 to a pump 16 by means of which the air intake member 14 may be inflated and deflated.

Alternatively, deflation of the air intake members 14 may be effected by an air ejector (not shown).

The shape of each air intake member 14 is such that when inflated, it extends upstream from (i.e. above) the remainder of its respective engine 11 and outwardly of the external skin 10', so as to guide the air passing into the engine. When, however, the pump 16 is operated to deflate its air intake member 14, the air intake member 14 is drawn into and retained in the annular space 13, so that it no longer extends forwardly of the remainder of the engine and outwardly of the external skin 10' of the aircraft.

Alternatively, each of the air intake members 14 may be inflated by virtue of being connected to a tapping (not shown) to one of the said forward propulsion engines.

The air intake members 14 may be replaced by air intake members 17, as shown in FIGURE 3. Each air intake member 17, which is constituted by a tube of rubber or like resilient material, is provided with a series of apertures 18, through which air may escape when the air intake member 17 is being inflated by the pump 16.

The air emitted through the apertures 18 constitutes a boundary layer energising jet of air which passes over the surface of the respective air intake member 17 and so into the respective engine, the said jet entraining a flow of ambient air which does not become separated from the said jet before entering the engine.

FIGURE 4 shows a vertical lift engine 11 provided with an air intake member 20 having an aperture 21 through which, when the air intake member is inflated as shown, may pass a boundary layer energising jet indicated by arrow 22. When deflated, the air intake member 20 is drawn into the annular space 13 between the engine 11 and its housing 12.

In FIGURES 5 and 6 there is shown a vertical lift engine 11 provided with an air intake member 24 which is mainly formed of rubber or like resilient material but which is provided with an annular part 25 of the metal wall of the housing 12 within which the vertical lift engine is mounted. When the air intake member 24 is inflated, as shown in FIGURE 5, the annular part 25 emerges smoothly into the remainder of the air intake member 24 and helps to guide the air passing into the engine. When, however, the air intake member 24 is deflated, as shown in FIGURE 6, the annular part 25 immediately surrounds the engine 11 and merges smoothly with the remainder of the wall of the housing 12.

In FIGURES 7 and 8 there are shown two vertical lift engines 11 having a common air intake member 26 which carries a grid 27 having a plurality of guide vanes 30. When the air intake member 26 is inflated, as shown in FIGURE 7, the grid 27 is disposed in an operative position in which the guide vanes 30 guide the air passing into the engines 11. When, however, the air intake member 26 is deflated, as shown in FIGURE 8, the grid 27, together with the air intake member 26, is retracted into an inoperative position within a space 31.

A pair of side doors 32 are movable (e.g. by virtue of being connected to the air intake member 26) between the open position, shown in FIGURE 7, in which they permit air to enter the engines 11, and the closed position, shown in FIGURE 8, in which they prevent air from entering the engines 11.

In FIGURES 9 and 10 there are shown two vertical lift engines 11 having a common air intake member 33 which has a portion 34 which forms an inflatable guide vane, the interior of the portion 34 being connected to the interior of the intake member 33, for example, by means of a flexible hose 34a. A pair of side doors 35 are connected to the air intake member 33 for movement therewith.

When the air intake member 33 is inflated, as shown in FIGURE 9, the side doors 35 are open to permit air to enter the engines 11, while the inflatable guide vane 34 is inflated through the hose 34a to guide the air passing into the engine.

When, however, the air intake member 33 is deflated, as shown in FIGURE 10, and is drawn into the annular space 13 between the engines 11 and the housing 12, the inflatable guide vane 34 will also be deflated and drawn within the annular space 13, while the side doors 35 will be closed and will prevent air entering the engines 11.

In FIGURES 11 and 12 there are shown two vertical lift engines having a common air intake member 36 in which is mounted within a forwardly facing, retractable, intake scoop 37.

When the air intake member 36 is inflated, as shown in FIGURE 11, the scoop 37 is extended so that in operation it scoops ram air into the engines 11. When, however, the air intake member 36 is deflated, the scoop 37 is retracted to a position in which it prevents air entering the engines 11.

The construction shown in FIGURES 5–12 could employ air intake members emitting a boundary layer energising jet, as in FIGURES 3 and 4.

We claim:

1. An aircraft comprising an aircraft structure having an external skin, a vertically extending housing in said aircraft structure and open at both ends with the upper end of the same being substantially flush with the external skin of the aircraft structure, at least one vertical lift jet engine mounted in said housing and spaced therefrom at least at its upper end by a space, an inflatable air intake member mounted at the upper end of said engine, said air intake member being arranged when inflated to extend outwardly of the external skin of the aircraft structure and when deflated to be stored inwardly of the external skin of the aircraft structure in the space between said engine and said housing, and means for inflating and deflating said air intake member.

2. An aircraft as claimed in claim 1 in which said inflatable air intake member is a double-walled member.

3. An aircraft having a housing, a vertical lift jet engine which is vertically mounted in said housing and is spaced therefrom by an annular space, an inflatable air intake member mounted at the upper end of the engine, the air intake member, when inflated, extending above the remainder of the engine and outwardly of the housing, and, when deflated, being disposed in said annular space, and means for inflating and deflating said air intake member, and a rigid annular part of the wall of said housing being attached to said air intake member, the said annular part of the wall immediately surrounding the engine and merging smoothly with the remainder of the housing when the air intake member is deflated.

4. An aircraft having a vertically mounted vertical lift jet engine, an inflatable air intake member mounted at the upper end of the engine, the air intake member, when inflated, extending above the remainder of the engine and outwardly of the external surface of the aircraft, and, when deflated being prevented from so extending, means for inflating and deflating the air intake member, and inflatable guide vane means carried by the air intake member and which, when the latter is inflated, is inflated to lie in an operative position in which the air passing into the engine is guided thereby, said guide vane means being deflated and retracted into an inoperative position when said air intake member is deflated.

5. An aircraft having a vertically mounted vertical lift jet engine, an inflatable air intake member mounted at the upper end of the engine, the air intake member, when inflated, extending above the remainder of the engine, and, when deflated, being prevented from so extending, means for inflating and deflating the air intake member and means providing at least one aperture in said air intake member through which, when the air intake member is inflated, there passes a boundary layer energising jet of air which passes over the surface of the air intake member and so into the engine, the said jet entraining a flow of ambient air which remains unseparated from the said jet before entering the engine.

6. A vertically mounted vertical lift jet engine having an inflatable air intake member, means for inflating and deflating the air intake member, and means providing at least one aperture in said air intake member through which, when the air intake member is inflated, there passes a boundary layer energising jet of air which passes over the surface of the air intake member and so into the engine, the said jet entraining a flow of ambient air which remains unseparated from the said jet before entering the engine.

7. An aircraft comprising an aircraft structure having an external skin, a vertically extending housing in said aircraft structure and open at both ends with the upper end of the same being substantially flush with the external skin of the aircraft structure, at least one vertically mounted vertical lift jet engine, an inflatable air intake member mounted at the upper end of the engine, the air intake member, when inflated, extending above the external skin of the aircraft structure, and, when deflated, being prevented from so extending, means for inflating and deflating the air intake member, and guide vane means which are carried by the air intake member and which, when the air intake member is inflated, are disposed in an operative position in which they guide the air passing into the engine, the guide vane means being retracted into an inoperative position when the air intake member is deflated.

8. An aircraft as claimed in claim 7 in which the guide vane means comprises a grid having a plurality of guide vanes.

9. An aircraft having a vertically mounted vertical lift jet engine, and inflatable air intake member mounted at the upper end of the engine, the air intake member, when inflated, extending above the remainder of the engine, and, when deflated, being prevented from so extending, means for inflating and deflating the air intake member, and a forwardly facing, retractable intake scoop within which the air intake member is mounted and which, when the air intake member is inflated, is extended to cause air to be forced into the engine.

References Cited by the Examiner

UNITED STATES PATENTS

| | | | |
|---|---|---|---|
| 2,864,236 | 12/1958 | Toure et al. | 60—35.6 |
| 2,997,257 | 9/1961 | Kerry | 244—53 X |
| 3,054,578 | 9/1962 | Brocard | 244—23 |
| 3,074,232 | 1/1963 | Soyer | 244—53 |
| 3,128,966 | 4/1964 | Alvarez-Calderon | 244—42 |
| 3,129,910 | 4/1964 | Smith | 244—53 X |
| 3,130,941 | 4/1964 | Pazmany | 244—53 X |

MILTON BUCHLER, *Primary Examiner.*

ANDREW H. FARRELL, FERGUS S. MIDDLETON,
*Examiners.*